(12) United States Patent
Diez Garcia et al.

(10) Patent No.: US 10,718,653 B2
(45) Date of Patent: Jul. 21, 2020

(54) WATER LEVEL DETECTOR FOR FUEL FILTERS

(71) Applicant: CEBI ELECTROMECHANICAL COMPONENTS SPAIN, S.A., Villatuerta (Navarra) (ES)

(72) Inventors: Sergio Diez Garcia, Villatuerta (ES); Javier Garcia Izaguirre, Villatuerta (ES)

(73) Assignee: CEBI ELECTROMECHANICAL COMPONENTS SPAIN, S.A., Villatuerta (Navarra) (ES)

( * ) Notice: Subject to any disclaimer, the term of this patent is extended or adjusted under 35 U.S.C. 154(b) by 236 days.

(21) Appl. No.: 15/866,307

(22) Filed: Jan. 9, 2018

(65) Prior Publication Data

US 2018/0195890 A1 Jul. 12, 2018

(30) Foreign Application Priority Data

Jan. 12, 2017 (ES) ............... 201730018 U

(51) Int. Cl.
*G01F 23/24* (2006.01)
*B01D 36/00* (2006.01)

(52) U.S. Cl.
CPC .......... *G01F 23/242* (2013.01); *B01D 36/005* (2013.01)

(58) Field of Classification Search
CPC ............ G01F 23/242; B01D 36/005
USPC ....................................................... 73/304 R
See application file for complete search history.

(56) References Cited

U.S. PATENT DOCUMENTS

| | | | | |
|---|---|---|---|---|
| 4,276,161 A * | 6/1981 | Matsui | ............... | B01D 17/0214 210/86 |
| 6,471,070 B2 * | 10/2002 | Janik | .................. | B01D 29/15 210/438 |
| 7,871,515 B2 * | 1/2011 | Brandt | ................... | B01D 29/21 210/232 |
| 8,257,581 B2 * | 9/2012 | Ferrari | .............. | B01D 17/0202 210/96.1 |
| 9,072,992 B2 * | 7/2015 | Mendel | ................ | B01D 35/143 |
| 9,361,779 B2 * | 6/2016 | Styfhoorn | .......... | G01N 33/2847 |
| 2015/0021246 A1 * | 1/2015 | Sturgess | ................ | B01D 35/18 210/104 |

* cited by examiner

*Primary Examiner* — Octavia Hollington
(74) *Attorney, Agent, or Firm* — Lucas & Mercanti, LLP

(57) ABSTRACT

A water level detector for fuel filters which has a first body and a second body, the first body and the second body being able to be joined together, jointly forming an outer enclosure of the water level detector; and components to detect water in the fuel filters housed by the outer enclosure. The water level detector also includes a plurality of protrusions and housings adapted to transmit relative turning of the first body and the second body together, jointly forming the outer enclosure, and a plurality of tabs and slots adapted to establish axial retention, such that the first body and the second body remain joined together, the first body and the second body jointly forming the outer enclosure.

12 Claims, 4 Drawing Sheets

WATER LEVEL DETECTOR FOR FUEL FILTERS

CROSS REFERENCE TO RELATED APPLICATION

This Application claims priority of Spanish Patent Application No. U201730018 filed on Jan. 12, 2017, which is incorporated herein by reference.

TECHNICAL FIELD

The present invention is related to the industry dedicated to water level detectors for fuel filters, and more specifically, the industry dedicated to water level detectors with two bodies to be joined together.

STATE OF THE ART

Today it is known that there is a need to eliminate water from the fuel of diesel engines contained therein in order to prevent said water from coming in contact with sensitive elements of injection systems of said engines, on which the water may have a damaging effect due to corrosion phenomena, such as oxidation and deposition of insoluble salts.

Water is separated from diesel by means of the use of diesel filters. The water that is separated from the fuel of diesel engines is decanted and collected in a specific area for it, which, since water is denser than diesel, is usually located in the lower part of the enclosure of the diesel filters.

Water sensors are provided in the diesel filters. A warning sign is emitted by these sensors when the decanted water reaches a pre-determined maximum level in the lower part of the enclosure of the diesel filters. The warning sign indicates the need to extract the collected water before it causes damage to the engines.

Water detectors which comprise two main parts or bodies to be joined forming an outer enclosure, housing inside itself components required to detect water collected in the enclosure of the fuel filters, are known. The joint between the two aforementioned main bodies should be secure against undesired separations of the two bodies, one with respect to the other, for the purpose of preventing moisture and liquid filtrations that may lead to operational problems in the aforementioned components. The known ways to establish the joint between said two bodies are either simple but ineffective, or effective but complex and expensive.

Therefore, there is a need for a solution that ensures the joint between the two main bodies of the water level detectors for fuel filers, at the same time providing simplicity in the joint, and without being a very expensive solution.

OBJECT OF THE INVENTION

With the aim of achieving this objective and solving the technical problem discussed up until now, in addition to providing additional advantages that may arise later, the present invention relates to a water level detector for fuel filters, which comprises a first body and a second body, the first body and second body being able to be joined together, jointly forming an outer enclosure of the water level detector; and components to detect water in the fuel filters housed by the outer enclosure.

The water level detector object of the invention further comprises torque transfer means to transmit relative turning of the first body and the second body together, jointly forming the outer enclosure; and attachment means to establish axial retention, such that the first body and the second body remain joined together, the first body and the second body jointly forming the outer enclosure. Thus, the water level detector ensures the relative position between the first body and the second body.

The torque transfer means comprise protrusions and housings, the protrusions being able to be inserted into the housings. The protrusions have a bevel on an insertion end of the housings in order to favor said insertion. Furthermore, the protrusions and housings are complementarily sized to each other. Preferably, the protrusions are located on the first body and the housings are located on the second body, although alternatively, they may be located the other way around.

Preferably, the protrusions and the housings are angularly distributed by pairs, such that the transfer of relative turning between the first body and the second body when joined together is reinforced, given that the space used is reduced.

Furthermore, at least one of the pairs formed by two of the protrusions have a groove, and at least one of the pairs formed by two of the housings have a rib, the ribs being available to be fit into the grooves. In this way, the transfer of relative turning between the first body and the second body is ensured and carried out in the most efficient manner, since each of the protrusions comes in contact with the corresponding housing at the sides and in both turning directions.

The attachment means comprise tabs and slots, the tabs being able to fit into the slots. Preferably, the tabs are located on the first body and the slots are located on the second body, although alternatively they may be located the other way around.

Preferably, the tabs have a toothed shape that can fit into the slots with snap-fitting. The toothed shape of the tabs is configured such that it favors snap fitting when coupling said bodies at the same time as axial retention between them. The toothed shape includes a bevelled plane to favor the insertion of the tabs into the slots. Likewise, the toothed shape includes a protruding plane to internally come in contact with the slot, the axial retention being established.

Furthermore, the tabs and the slots are extended along the perimeter of the outer enclosure. The protrusions and housings, inserted between the aforementioned tabs and slots, are also arranged along the perimeter of the outer enclosure. Thus, the surface and volume of the water level detector is used effectively, further facilitating the manufacture or construction thereof to which the present object refers.

DETAILED DESCRIPTION OF THE INVENTION

Figure 1:
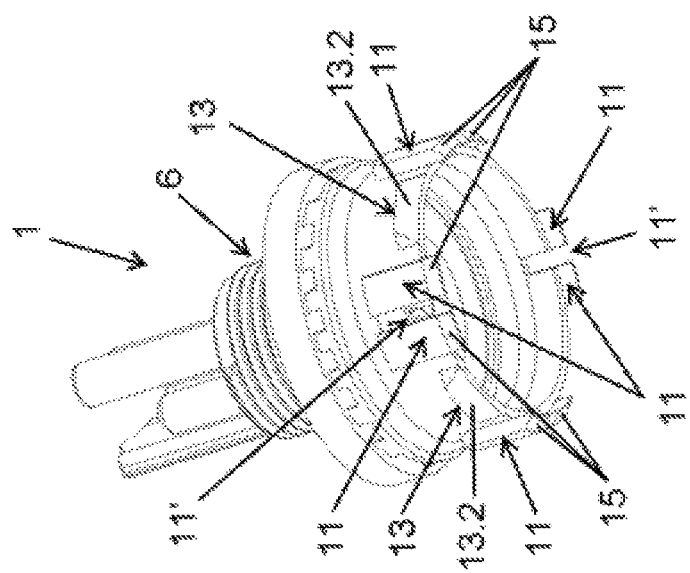
FIGS. 1 and 2 show perspective views of a first body comprised in a water level detector for fuel filters, object of the present invention, according to an exemplary embodiment.
Figure 2:
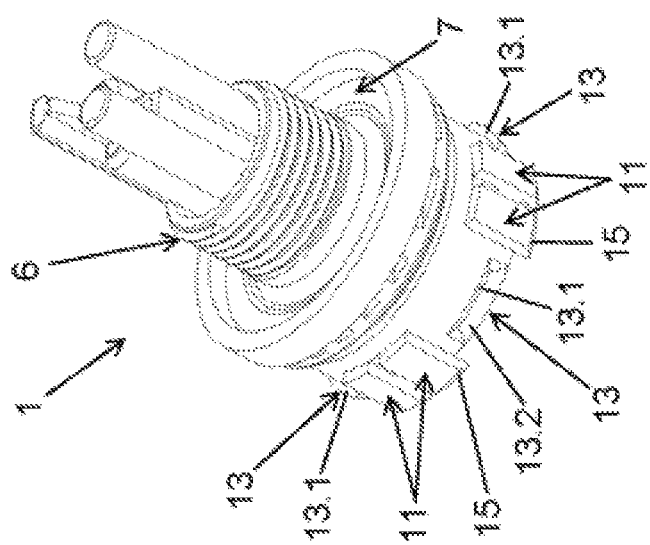
Figure 3:
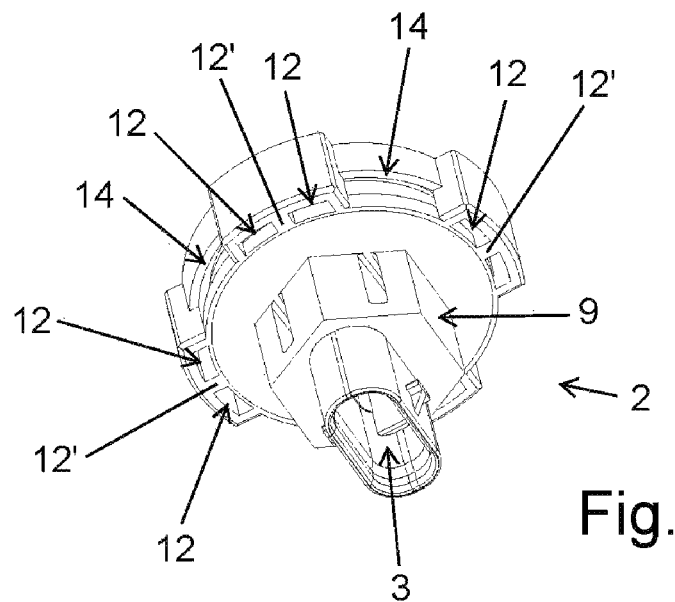
FIGS. 3 and 4 show perspective views of a second body comprised in the water level detector for fuel filters, object of the present invention, according to an exemplary embodiment.
Figure 4:
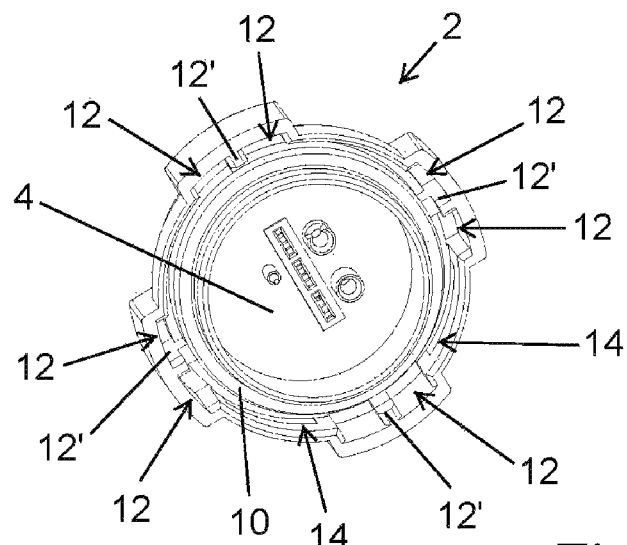
Figure 5:
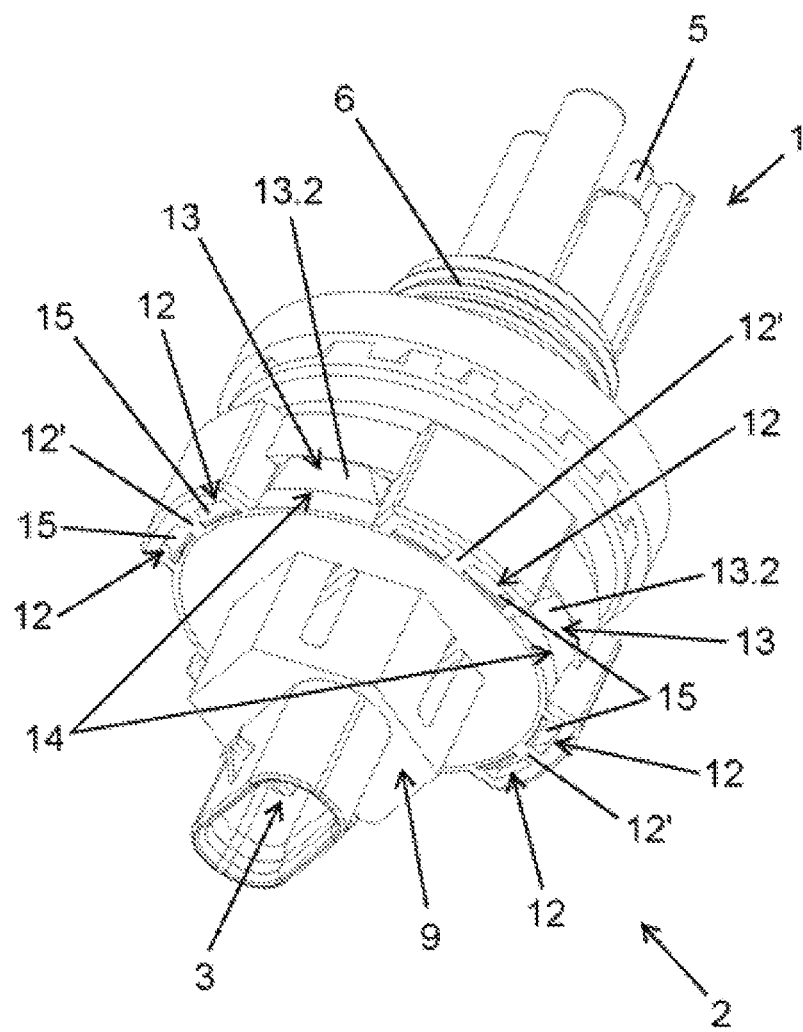
FIGS. 5 and 6 show perspective views of the water level detector for fuel filters, object of the present invention, the first body and the second body being joined together.
Figure 6:
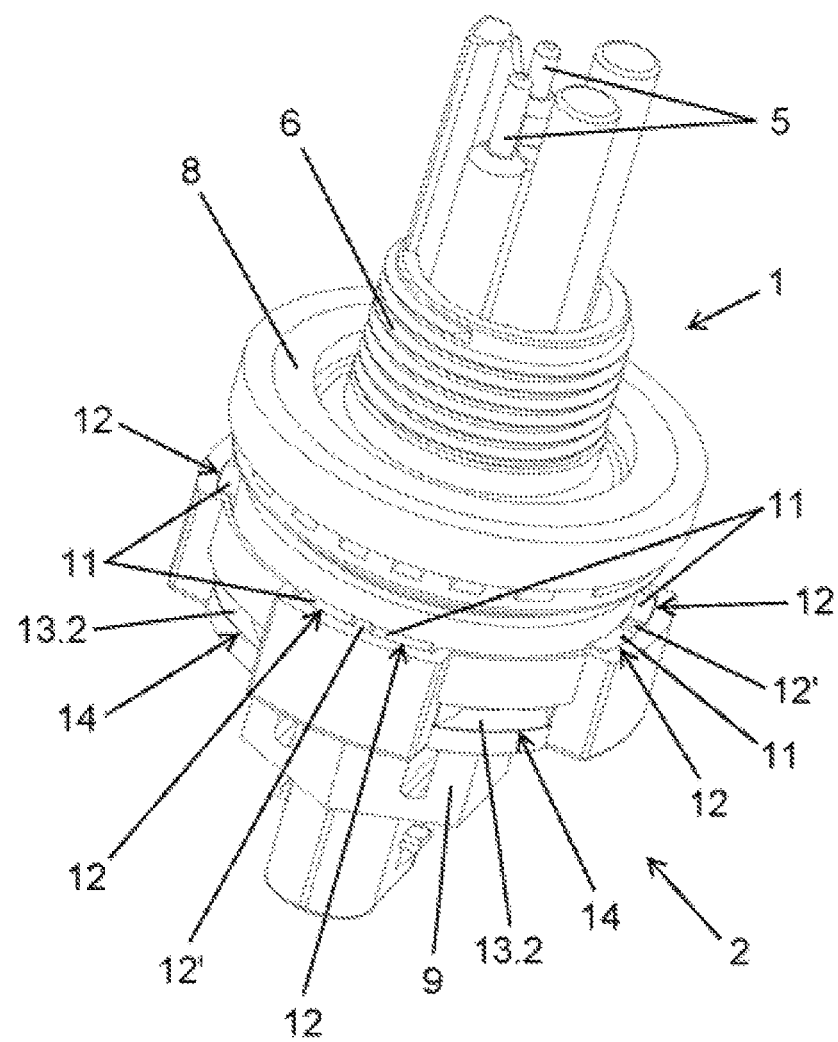

The invention relates to a water level detector for fuel filters which comprises a first body (1) and a second body (2), in addition to an assembly of components. The first body (1) and the second body (2), joined together, jointly form an outer enclosure such that they house or enclose the components.

These components include electrical connection terminals (3), a printed circuit board (4) and electrodes (5). The connection terminals (3) are externally projected with respect to the second body (2) in order to establish an electrical connection with external apparatuses that are additional to the water level detector. Said connection terminals (3) come in contact with the printed circuit board (4) as well as the electrodes in order to be jointly connected. The connection terminals (3) are located in correspondence to the second body (2), while the electrodes (5) are mostly developed through the first body (1) according to an axial direction of the level detector.

The first body (1) comprises an external thread (6) to be threaded once it is arranged in an enclosure or bowl, which is not object of the present invention. The water level detector for fuel filters further comprises an external sealing gasket (8) in order to establish a sealed joint by means of compression of the sealing gasket (8) between both in the threaded arrangement of the first body (1) in the bowl. The first body (1) has a channel (7) to receive, at least partially, said sealing gasket (8) such that it enables compression thereof.

The water level detector of the invention comprises a torsion area (9) configured to transmit an externally received tightening torque to the first body (1) for the arrangement thereof by threading in the bowl. Preferably, the torsion area (9) has a polygonal transverse cross section to favor the grip thereof on the transfer of the tightening torque and it is located on the second body (2) in order to favor the access thereof.

The water level detector for fuel filters further comprises an internal sealing gasket (10) in order to establish another sealed joint by means of compression of said internal sealing gasket (10) between both in the joint between the first body (1) and the second body (2) coupled together.

According to that described, the water level detector comprises torque transfer means (11, 12) and attachment means (13, 14). The torque transfer means (11, 12) are configured to transfer, for example, the tightening torque received in the torsion area (9) to the second body (2). The attachment means (13, 14) are configured to establish an axially immobile joint or fastener between the first body (1) and the second body (2).

The torque transfer means (11, 12) comprise protrusions (11) and housings (12). Preferably, the protrusions (11) are distributed according to angular distribution and arranged on the periphery of the first body (1). The protrusions (11) are grouped by pairs, there being four pairs of protrusions (11) in total. The housings (12) are preferably are distributed according to the angular distribution of the protrusions (11) being arranged on the periphery of the second body (2). Likewise, the housings (12) are grouped by pairs, there being four pairs of housings (12) in total, one for each pair of protrusions (11).

Each of the housings (12) and each of the protrusions (11) are jointly sized to be dimensionally complementary to each other; in other words, the protrusions (11) are introduced by means of insertion into the housings (12) in a fitted way. Furthermore, the protrusions (11) have a bevel (15), in other words, an oblique cut, on an insertion end in the corresponding housing (12) in order to favor insertion.

Each of the pairs of protrusions (11) has a groove (11') of separation and each of the pairs of housings (12) has a rib (12') of separation, the grooves (11') and the ribs (12') being complementary to each other for coupling.

In this way, each of the pairs of protrusions (11) can be inserted into one of the pairs of housings (12), the corresponding rib (12') being housed in the correct groove (11'). Thus, given an angular turn of the second body (2) with respect to the first body (1), each of the housings (12) transmits a turning force due to the angular turn to the protrusion (11) that is housed therein, regardless of whether the angular turn is clockwise or counterclockwise.

This configuration makes it possible to provide eight torque transfer points between the first body (1) and the second body (2) through four locations. In this way, a simple, but very effective configuration is offered when fulfilling the purpose of preventing undesired relative turning between the first body (1) and the second body (2), both being arranged together according to the position of use of the water level detector for fuel filters, in other words, the first body (1) and the second body (2) being joined together by coupling.

The attachment means (13, 14) comprise tabs (13) and slots (14). Preferably, the tabs (13) are distributed according to angular distribution and arranged on the periphery of the first body (1). There are as many tabs (13) as pairs of protrusions (11), each of the tabs (13) being between two pairs of protrusions (11) radially next to each other. Likewise, a single tab (13) can be located between two pairs of protrusions (11) angularly distributed immediately next to each other. The slots (14) are preferably distributed according to the angular distribution of the tabs (13) being arranged on the periphery of the second body (2).

Each of the slots (14) and each of the tabs (13) are jointly sized to be dimensionally complementary to each other. The tabs (13) are introduced into the slots (14) with pressure. Furthermore, each of the tabs (13) has a toothed shape in order to establish axial retention by maintaining the first body (1) coupled to the second body (2), the corresponding tab (13) being housed or introduced into the correct slot (14). The toothed shape includes a protruding plane (13.1) to internally come in contact with the slot (14) in the axial retention, in other words, the tab (13) being housed or introduced into the slot (14).

In this way, each of the tabs (13) can be housed in correspondence with one of the slots (14), the axial retention of the first body (1) being established with respect to the second body (2) by means of attachment to the slot (14), such that undesired or unintentional separation between both bodies (1, 2) is impeded.

The tabs (13) are inserted into the slots (14) with pressure, bringing the first body (1) and the second body (2) closer together, thus leading to snap-fitting in each of the cases. The toothed shape of the tabs (13) is configured such that it favors snap-fitting in the coupling between both bodies (1, 2) as well as the axial retention between them. Therefore, the toothed shape further includes a beveled plane (13.2) that favors said insertion of the tabs (13) into the slots (14). This facilitates the coupling between both aforementioned bodies (1, 2) without requiring complex tools or configurations.

In the release, however, it is necessary to carry out plastic deformation, or breakage, of the tabs (13) and/or slots (14) individually. This makes it very difficult for the undesired or unintentional separation of the first body (1) and the second body (2) to take place. The inviolability of the joint described means that if both bodies (1, 2) are separated by any means, said bodies (1, 2) remain such that the possibility of joining them again is prevented, thus avoiding unauthorized or undesired repairs or modifications of the water level detector.

Both the bevels (15) and the beveled planes (13.2) further prevent interferences that could result in dimensional variations in the tolerance ranges thereof. This provides advantages from the point of view of the coupling or joining of the first body (1) and the second body (2), as well as from the point of view of the manufacture of both bodies (1, 2).

This configuration takes advantage of the perimeter edge corresponding to the protrusions (11) and the housings (12) so that, in addition to ensuring the efficient transfer of relative turning between the first body (1) and the second body (2), it ensures the axially immobile coupling between them according to the position of use of the water level detector for fuel filters.

The invention claimed is:

1. A water level detector for fuel filters, comprising:
   a first body and a second body, the first body and the second body being able to be joined together, and forming an outer enclosure of the water level detector; and
   components to detect water in the fuel filters housed by the outer enclosure;
   torque transfer means to transmit relative turning of the first body and the second body together, jointly forming the outer enclosure; and
   attachment means to establish axial retention, such that the first body and the second body remain joined together, the first body and the second body jointly forming the outer enclosure.

2. The water level detector according to claim 1, wherein the torque transfer means comprise protrusions and housings, the protrusions being able to be inserted into the housings.

3. The water level detector according to claim 2, wherein the protrusions have a bevel on an insertion end of the housings.

4. The water level detector according to claim 2, wherein the protrusions are located on the first body and the housings are located on the second body.

5. The water level detector according to claim 2, wherein the protrusions and the housings are angularly distributed by pairs.

6. The water level detector according to claim 5, wherein the pairs formed by two of the protrusions have a groove and the pairs formed by two of the housings have a rib, the ribs being available to be fit into the grooves.

7. The water level detector according to claim 1, wherein the attachment means comprise tabs and slots, the tabs being able to fit into the slots.

8. The water level detector according to claim 7, wherein the tabs are located on the first body and the slots are located on the second body.

9. The water level detector according to claim 7, wherein the tabs have a toothed shape that can fit into the slots with snap-fitting.

10. The water level detector according to claim 9, wherein the toothed shape includes a beveled plane to favor the insertion of the tabs into the slots.

11. The water level detector according to claim 9, wherein the toothed shape includes a protruding plane to internally come in contact with the slot in the axial retention.

12. The water level detector according to claim 7, wherein the tabs and the slots are extended along the perimeter of the outer enclosure.

* * * * *